May 28, 1957   J. COQUELET   2,794,068
TELEPRINTER RECEIVER
Filed Sept. 30, 1955   4 Sheets-Sheet 3

May 28, 1957 J. COQUELET 2,794,068
TELEPRINTER RECEIVER
Filed Sept. 30, 1955 4 Sheets-Sheet 4

United States Patent Office 2,794,068
Patented May 28, 1957

2,794,068

TELEPRINTER RECEIVER

Jules Coquelet, Jamioulx, Belgium, assignor to Ateliers de Constructions Electriques de Charleroi, Brussels, Belgium, a corporation of Belgium Application September 30, 1955, Serial No. 537,859

Claims priority, application France December 13, 1954

3 Claims. (Cl. 178—51)

The present invention relates to teleprinter receivers for operation by radio or by a telegraph line, wherein the different codes are formed by signals transmitted successively, the frequencies of these signals being selected from two distinct groups, and the reception of said signals being effected through the intermediary of two selectors comprising mechanical filters of the vibrating-reed type, each of the selectors corresponding to one of the two groups of frequencies.

It also relates to teleprinters wherein the receiving station makes use of selectors, each reed of which is adapted to strike a contact, the connection between these contacts and the actual printing mechanism being effected through the intermediary thyratrons. In general, two groups of thyratrons are used, each group corresponding to one selector, that is to say, to one group of frequencies. When the two signals have been received, a relay through which the current from the thyratrons of the second group passes, operates the printing mechanism.

The present invention relates more especially to teleprinters wherein use is made of twelve distinct frequencies, divided into two groups of eight and four frequencies respectively, thus permitting the transmission and reception of thirty-two different codes.

It is observed that at the receiving station mechanical filters of the vibrating-reed type are subject to a lag effect which is harmful to the correct operation of the teleprinters, that is to say, when a reed has commenced vibration and has struck its contact under the impulse of a signal of predetermined frequency, this reed continues to vibrate for a certain time. In mechanical filters of high selectivity, the result is that if the following signal, intended to set another reed in resonant vibration, is of a frequency which is very close to that of the preceding signal, the first reed, which has still retained a certain degree of vibration, can be caused to strike its contact again. This results in an error in the printing.

According to the present invention, means are provided to cause a selector reed which has been set in vibration to return to rest before fresh use is made of said selector, in such a manner as to eliminate all lag effect of the vibrating reed.

According to further features of the invention, (1) two pairs of sleectors are used, operated alternately by means of a change-over device, so that two successive combinations of two signals are never selected by one and the same pair of selectors.

(2) the windings or reeciving coils of the two pairs of selectors are connected in series and the change-over device comprises two relays provided with contacts and being energizable by the energization or de-energization of a relay controlling the printing mechanism, the two first-mentioned relays having two opposing windings and two assisting windings respectively, an armature controlled by the relay with two opposing windings short circuiting one or other set of selectors.

Other features of the invention are as follows:

(1) in a selector, a vibrating reed which has struck its contact is returned to rest by a damper acting mechanically upon the reed.

(2) the said damper comprises a plate pivotable about an axis by the action of an electro-magnet, said electro-magnet being energized as soon as the vibrating reed has struck its contact.

(3) each selector of one group of frequencies comprises a single damper acting simultaneously on all the reeds of the selector.

(4) the electro-magnet controlling the damper of a selector is energized by the closing of the contacts of a relay through the winding of which flows the current from the thyratrons of the group of frequencies corresponding to said selector.

The invention is hereinafter described with reference to the accompanying drawings which show, by way of non-imitative example, devices for eliminating the lag effect inherent in mechanical filters of vibrating-reed type.

The change-over device shown in Figs. 1a, 1b, 1c and 1d utilizes two pairs of selectors in such a way that two successive signal combinations are neevr selected by the same pair of selectors, these figures relating to the case where each code is represented by two signals of different frequencies transmitted successively. Thus there are two selectors of which the windings are represented diagrammatically by I and II for the first pair or set, and two selectors, of which the windings are represented by I' and II' for the second pair or set. The windings of the four selectors are connected in series from earth or ground (at the bottom of Figs. 1a–1d) to a signal line (shown at the upper left of the figures). Every time a signal combination has be registered completely by the selectors, the relay RII operates to initiate the printing and is then cut off as soon as the mechanical selection is terminated. When the relay RII is energized, it closes normally open contacts B2. The device further comprises two relays RIII and RIV. Relay RIII has two windings wound in the same direction and actuates two change-over contacts B3 and B'3, which are in the position shown in Figs. 1a and 1b when the relay RIII is de-energized, and are in the position of Figs. 1c and 1d when either or both of the relay windings are energized. Relay RIV has two oppositely wound windings and actuates a change-over contact B4 and two contacts B'4 and B"4, all of which assume the position of Figs. 1a and 1d when both windings of the relay RIV are either energized, and all of which are impelled into the position of Figs. 1b and 1c when only the right-hand winding is energized.

The change-over action takes place in four stages shown diagrammatically by Figs. 1a, 1b, 1c and 1d, respectively. In these figures, the parts of the circuit through which current is flowing are represented in heavier lines.

Figure 1A:
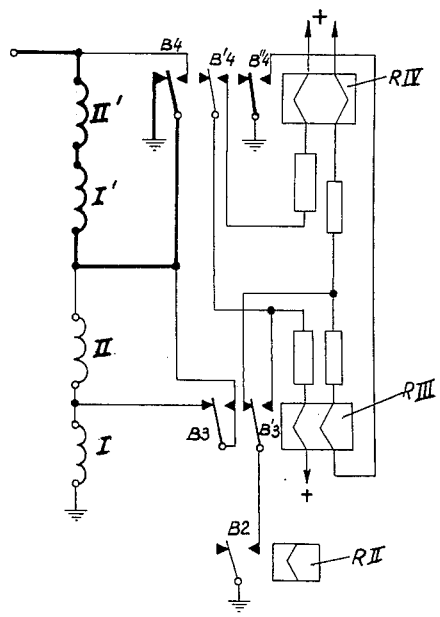
Figs. 1a, 1b, 1c and 1d show circuit diagrams of a change-over device utilizing two pairs or sets of selectors.
Figure 1C:
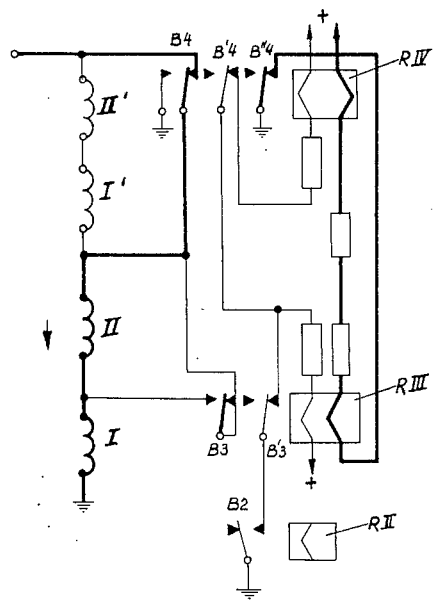

As will be clear from the following discussion, in the initial condition of the apparatus the windings I' and II' of the first pair of selectors is connected to the signal line in condition for the reception of signals (stage 1, Fig. 1a); in the second stage, winding I alone is operatively connected to the signal line (stage 2, Fig. 1b); and in the third stage, windings I and II are operatively connected to the signal line (stage 3, Fig. 1c). Fig. 1d shows the change-over apparatus in the process of returning to the condition of stage 1. The complete change-over operation is as follows:

(a) Stage 1 (Fig. 1a). This is the rest position of the change-over device, in which it is ready for reception of the first signal. As shown, windings I' and II' are operatively connected to the signal line and are connected to ground through the back contact B4 of relay RIV. The windings I and II of the other pair or set of selectors are short-circuited by the back contact B3 of relay RIII.

Figure 1B:
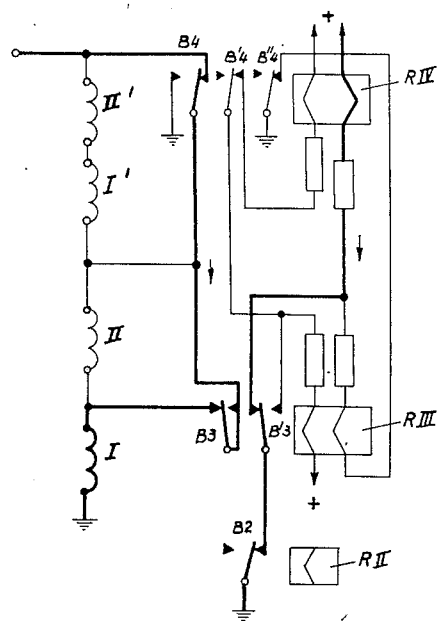
Figure 1D:
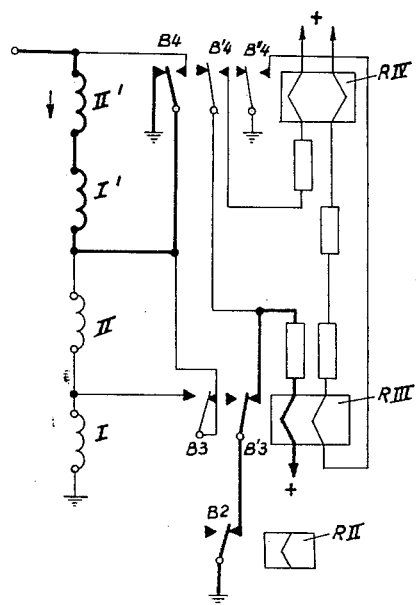
Figure 4:
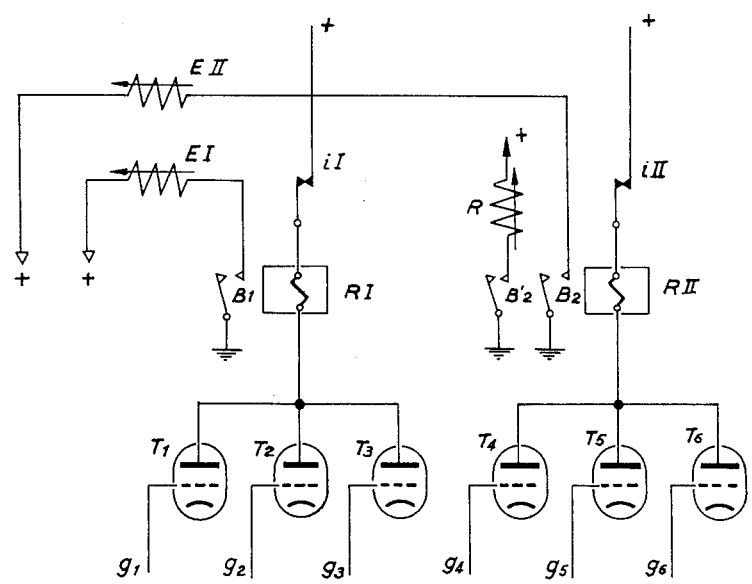
Fig. 4 is a circuit diagram of part of a receiving device utilizing selectors provided with dampers.

(b) Stage 2 (Fig. 1b). When the first signal combination is received, relay RII is energized (in a manner more clearly to be explained hereinafter in connection with Fig. 4) and closes its relay contact B2. This completes the energizing circuit for the first, right-hand winding of relay RIV, through back contact B3 of relay RIII. Relay RIV thereupon pulls its contacts to the right so that contact B4 now short-circuits windings I' and II', and II and operatively connects winding I alone to the signal line.

(c) Stage 3 (Fig. 1c). As soon as the mechanical selection by the vibrating reed selectors has terminated, relay RII is de-energized, in a manner to be described, and opens its contacts B2. Relay RIII is energized over the path shown and operates its contacts B3 and B'3 to pull them to the right. Due to the opening of the back contacts of B3, only the windings I' and II' are now short-circuited, so that the next signal combination which follows is received by the two windings I and II.

(d) Stage 4 (Fig. 1d). When the second signal combination is received, relay RII is again energized and contact B2 is again closed. Current passes through the second (left-hand) winding in a direction to assist the still energized first winding. Relay RIII thus remains in the same condition as for Stage 3. Current also passes through the second, left-hand winding of relay RIV by way of contact B'4. The second winding of relay RIV opposed the still energized first winding of such relay, so that the contacts of the relay move to the left, contacts B'4 and B''''4 opening and contact B4 changing over to close the circuit to ground through its back contact. Thus windings I' and II' of one pair of selectors are again in the condition of Fig. 1a, ready to receive a new signal combination. As soon as the mechanical selection is terminated, relay RII opens, relay RIII is thus de-energized, and the change-over apparatus is again completely in the condition shown in Fig. 1a.

The cycle which has just been described is reproduced identically for all the following signal combinations. Due to this fact, the time left to each selector before its re-use is sufficiently long for the lag effect no longer to cause the device to make errors in printing.

Figure 2:
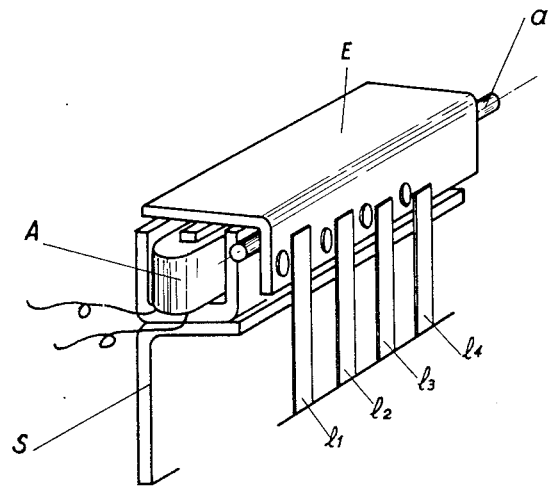
Fig. 2 represents part of a selector provided with a damper.
Figure 3:
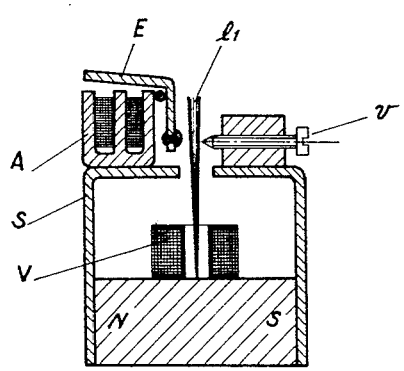
Fig. 3 is a cross-section of the selector represented in Fig. 2.

In Figs. 2 and 3 there is shown one of the four selectors employed in the apparatus of the invention. Such selector has vibrating reeds $l_1$, $l_2$, $l_3$ and $l_4$, located in the magnetic field of a permanent magnet NS carrying a receiving winding or coil, there designated V. This selector is provided with a damper comprising a plate E pivotable about an axis $a$ by the action of an electromagnet A fixed on the selector support S. When a signal passes into the winding V of the selector, the reed attuned to the frequency of the signal, for example $l_1$ will vibrate. As soon as it strikes the contact $v$, the signal is registered. This contact $v$ comprises a screw, the spacing of which from the reed can be regulated. This regulatable spacing thus defines the time of response of the reed, and thus the band-width of this mechanical filter.

The different contacts of the reeds are connected with the grids of thyratrons. In the case where two groups of frequencies are utilized for the transmission of the different codes, two groups of thyratrons T1, T2, T3 and T4, T5, T6 (see Fig. 4) are provided, the grids of which, g1, g2, g3 and g4, g5, g6, are connected respectively to the reeds of two selectors having receiving windings respectively, through a fixed resistance (not shown). When a reed of the first selector makes contact, a thyratron, for example T1, passes current. The relay RI is energized and closes its contact B1. Due to this fact, the damper EI operates and the vibration of the reed of selector having winding I is arrested.

Immediately after a reed of the second selector makes contact relay RII is energized and closes its contacts B2 and B'2. B'2 controls a winding R for actuating the mechanism printing the code received, while B2 controls the damper EII of the selector having winding II.

Figure 5:
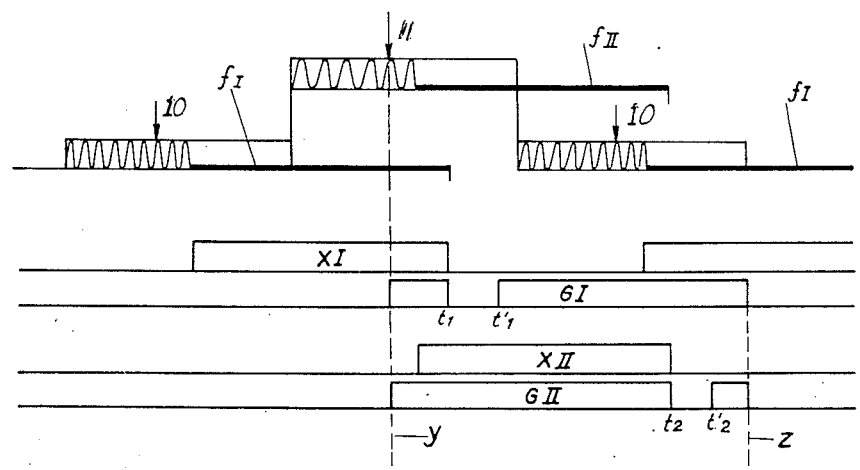
Fig. 5 is a diagram to illustrate the damping of the oscillations of the vibrating reeds.

The operation of the device will be better understood from Fig. 5 showing diagrammatically chronological sequence of the different operations.

When the signal corresponding to a frequency of the first group is received by the first selector, a reed of the latter strikes its contact at the time point indicated by the arrow 10. At this moment, relay RI is energized and damper EI operates. The thickened line $f$I indicates the mechanical stopping of the oscillations. When the signal corresponding to a frequency of the second group is received by the second selector, a reed thereof strikes its contact at the time point indicated by the arrow 11. At this moment, relay RII is energized and damper EII operates (see the thickened line $f$II). At the same time the printing mechanism is actuated as is also a shaft associated with the printing mechanism and driven at constant speed, which carries two cams controlling the opening and closing of two switches $i$I and $i$II (see Fig. 4) interpolated in the circuits of relays RI and RII. The rotation of the cam shaft takes place in the interval of time indicated diagrammatically by Y—Z. Switch $i$I controlled by the cam GI, opens at $t$1 and closes again at $t'$1. Its opening brings to an end the energization of relay RI, indicated diagrammatically by XI, and thus the freeing of damper EI.

Switch $i$II controlled by the cam GII, opens at $t$2 and closes again at $t'$2. Its opening brings to an end the energization of relay RII, indicated by XII, and thus the freeing of damper EII. As may be seen from Fig. 5, there is a lapse of time, at least equal to the duration of an elementary signal, separating two signals of one and the same group. This time is taken advantage of to return the reed to rest by the action of the damper.

In the system utilizing two groups of frequencies with two selectors per group, only one damper is required per selector. At each reception of an elementary signal, all the reeds of the corresponding momentarily inoperative selector are held against vibration. This provides security against any interference which might be received during this locking period by any other blade of the selector in question.

What I claim and desire to secure by Letters Patent is:

1. A teleprinter receiver for the reception of code signals formed by two signals transmitted successively at frequencies selected from two distinct groups, comprising two alternately operated pairs of vibrating reed frequency selectors having signal receiving windings and an automatically operated change-over device for operatively connecting said selectors to a signal line so that two successive combinations of two signals are never selected by one and the same pair of selectors, the windings of the two pairs of selectors being connected in series, and the change-over device comprising two relays provided with contacts, means for controlling the first mentioned relays comprising a third relay which also control the printing mechanism, a first one of the two first mentioned relays having two opposed windings, the second one of the two first mentioned relays having two assisting windings, the first relay having an armature which selectively short-circuits the windings of one or the other pair of selectors.

2. A teleprinter receiver for the reception of code signals formed by two signals transmitted successively at frequencies selected from two distinct groups, comprising two alternately operated frequency selectors, each having a plurality of vibrating reeds responsive to different frequencies within its frequency group, a contact for each reed to close a circuit when the reed is vibrated, damping means to cause a selector reed which has been set in vibration to return to rest before a fresh use is made of said selector, said damping means comprising a pivotally mounted plate, an electromagnet to cause the plate to contact and damp the vibration of a vibrating reed, and a circuit for energizing the electromagnet, each selector responsive to a group of frequencies having a single means acting simultaneously on all the reeds of the selector, two groups of electric discharge tubes providing connection between the contacts of the selectors and the actual printing mechanism of the receiver, each group of tubes being connected to its respective selector, and a relay interposed in the outlet circuit of each of said groups of discharge tubes, each relay having contacts interposed in the energizing circuit of the electromagnet for the damping means of its associated selector to energize the electromagnet upon discharge of a tube of the group.

3. A teleprinter receiver as claimed in claim 2, in which each of the contacts against which the reeds strike comprises a screw, whereby the spacing of the contact can be adjusted so as to adjust the time of response of the reeds and thus their band-width.

References Cited in the file of this patent

UNITED STATES PATENTS

| | | |
|---|---|---|
| 1,793,700 | Kleinschmidt | Feb. 24, 1931 |
| 2,184,321 | Soller | Dec. 26, 1939 |
| 2,301,373 | Cox | Nov. 10, 1942 |
| 2,771,506 | Coquelet | Nov. 20, 1956 |